3,415,729
PREPARATION OF TETRAFLUORO-1,2-DIIODOETHANE
William J. Cunningham, Rockaway, and Anthony W. Yodis, Whippany, N.J., assignors to Allied Chemical Corporation, New York, N.Y., a corporation of New York
No Drawing. Filed Sept. 14, 1965, Ser. No. 487,320
9 Claims. (Cl. 204—163)

This invention relates to the preparation of tetrafluoro-1,2-diiodoethane. Tetrafluoro-1,2-diiodoethane (B.P. 113° C.) is a well known compound, known to be useful as a diene polymerization modifier and as a chemical intermediate for the production of telogens, which in turn may be used to prepare high molecular weight straight chain perfluoro acids useful in the manufacture of textile treating agents.

Attempts to prepare tetrafluoro-1,2-diiodoethane, by reacting iodine with tetrafluoroethylene at atmospheric pressure have been unsuccessful. For example, the failure to obtain this product by passing tetrafluoroethylene, at atmospheric pressure, into an alcoholic solution of iodine, is noted in U.S. Patent 2,424,667 to Raasch.

Heretofore, successful attempts to prepare this product directly from tetrafluoroethylene and iodine, with or without solvents, have had to rely upon the use of superatmospheric pressures of at least 25 p.s.i.a. (U.S. Patent 2,424,667 to Raasch). The commercial disadvantages of working under superatmospheric pressures are obvious and the particular and considerable disadvantages of preparing tetrafluoro-1,2-diiodoethane at superatmospheric pressures employing organic solvents are known and are discussed in U.S. Patent 3,076,041 to Twelves et al.

As a consequence, a variety of other methods are constantly being devised for preparing this important product, using different reagents and procedures. Many of such other methods which have been devised still require the use of superatmospheric pressures. Other methods are generally characterized by one or more of the following disadvantages: the requirement for use of a plurality of reagents, the requirement for use of catalysts, the requirement for relatively close control of a variety of operating conditions, the requirement for difficult and inefficient recovery procedures, and the result of less than the theoretical yields or conversions, for any one or all of the reactants employed, being obtained.

It has now been found, quite surprisingly, and directly contrary to the teachings of the art, that the reaction between tetrafluoroethylene and iodine to form tetrafluoro-1,2-diiodoethane can be simply and efficiently initiated and carried out to completion at atmospheric pressure by providing a source of actinic radiation and a reaction medium comprising a halogenated aliphatic hydrocarbon solvent and provided that certain operating temperature conditions are maintained. Moreover, by the process of the invention, tetrafluoro-1,2-diiodoethane product may be obtained in theoretical yields and conversions, based upon either the tetrafluoroethylene or iodine reactants, with minimal recovery and purification problems, or none at all, if the preferred solvent of the invention is employed.

It is accordingly an object of the invention to provide a successful method for preparing tetrafluoro-1,2-diiodoethane at atmospheric pressure, employing tetrafluoroethylene and iodine as the only reactants.

It is another object of the invention to provide a commercially feasible process for preparing tetrafluoro-1,2-diiodoethane which does not suffer from disadvantages encountered by prior methods described for the preparation of the same.

Another object of the invention is to provide a process for preparing tetrafluoro-1,2-diiodoethane which can be controlled so that no by-products are produced and so that theoretical yields and conversions can be obtained.

It is a preferred object of the invention to provide a method for the preparation of tetrafluoro-1,2-diiodoethane in which no recovery or purification means are required.

Other objects and advantages of the invention will become apparent from the following description:

Halogenated aliphatic hydrocarbon solvents are a well known class of solvents, many members of which will readily occur to one of ordinary skill in the art. Those members in which both iodine and tetrafluoroethylene are more appreciably soluble will make the more suitable solvent for use according to this invention. Illustrative members, which have been found to be quite satisfactory, include carbon tetrachloride, 1,2-dibromotetrafluoroethane and tetrafluoro-1,2-diiodoethane. The latter is, of course, the desired product and the use of such as the solvent constitutes a preferred embodiment since in such a case there will be no need for separating product from solvent.

The reaction will proceed in the presence of normally available light; however, more favorable reaction rates can be promoted by providing higher intensities of light within the reaction zone. Any form of light which is known to effect or promote chemical reaction may be employed. Such light is commonly referred to as actinic radiation. Ordinary daylight is suitable, but it is preferred to use artificial light and still preferably artificial visible light, such as red or white light from a high or low-pressure mercury vapor lamp or from an ordinary incandescent or fluorescent bulb. The preferred form of actinic radiation has a wave length in the range of about 4,000–7,000 Angstrom units. Generally, the higher the intensity of light provided to the reaction zone, the better will be the results.

The reactor employed should be of any transparent material which permits transmission of actinic radiation; for example, Pyrex glass, quartz, Vycor, polychlorotrifluoroethylene or other transparent inert fluorocarbon polymer. Alternatively, the reactor may be of a suitably corrosion resistant metal, provided with an internally disposed light source. Additionally, the apparatus should be provided with means for external temperature control and means for agitating the reactor contents. Other attachments may be provided as may be desired, as will be described in the examples.

The reaction will proceed over a fairly wide temperature range. Temperatures down to the freezing point of tetrafluoro-1,2-diiodoethane (−16° C.) may be employed. As temperature is increased above about 20° C., however, the reaction rate slows proportionately. For example, it has been found in some runs that at a temperature of 47° C., the reaction rates were only about ⅛ of those obtained in other runs which were carried out at a temperature of about 20° C., other conditions being the same. It can be said that at temperatures above about 50° C., the reaction rate is too slow for effective commercial operation. The preferred operating temperature range is from about 0–20° C.

As pointed out above, the surprising and notable achievement afforded by the invention process lies in the fact that the reaction can be initiated and preferably carried out to completion at atmospheric pressure. It is not necessary that absolute atmospheric pressures be used. The reaction will initiate at pressures below those previously thought to be necessary for initiation of the reaction (25 p.s.i.a.) and even at subatmospheric pressures. No advantage, however, accrues from operation at temperatures below atmospheric.

The reaction rate will depend upon such factors as the temperature, pressure, nature and distance of the light source and nature of the solvent employed. Vigorous stirring of the reaction medium will promote higher reaction rates. For example, it has been found that at atmospheric pressure; at a temperature of 20° C.; with a 150 watt incandescent light source with reflector, which light source is positioned 6″ from the surface of the reactants; with vigorous stirring and with the use of 1,2-dibromotetrafluoroethane as solvent; a reaction rate in the order of 0.34 mole (120 g.) product/hr./liter of solvent can be obtained. Under the same conditions, excepting using carbon tetrachloride as solvent, the reaction rate obtainable is in the order of 0.26 mole (92 g.) product/hr./liter of solvent. When tetrafluoro-1,2-diiodoethane is employed as the solvent, a reaction rate in the order of 0.23 mole (99 g.) product/hr./liter of solvent can be obtained.

Stoichiometry of the reaction requires a 1:1 molar ratio of iodine to tetrafluoroethylene. For expediency, an excess of iodine is maintained in the reaction zone, which will cause the reactant and solvent medium to possess a deep purple color until the iodine is essentially completely reacted at which time the color changes to a light pink. This color change serves as a convenient index for determining the progress of the reaction.

In practice of the invention, a quantity of solvent and iodine in an amount from about 2–10% by weight of the solvent is charged to a suitable reaction vessel. A large proportion of the iodine disolves but usually some remains in its solid state. Color of the solution in the flask turns a deep purple. A water bath surrounding the reaction vessel is controlled so as to maintain the temperature therein within the desired limits. Since a preferred operating temperature is at about 20° C., such can be maintained simply by the free flow of tap water. The light source is turned on. Tetrafluoroethylene is introduced through a gas inlet tube, which is immersed in the liquid contained in the reaction vessel, accompanied by constant and vigorous stirring. The rate of addition of tetrafluoroethylene gas is determined by its consumption and utilization in the reaction vessel. Thus, the rate is controlled so that no excess tetrafluoroethylene is present. This can readily be accomplished by providing an exit bubbler connected to the reaction flask. Maximum absorption of tetrafluoroethylene gas can then be determined by the point at which bubbles just begin to appear in the exit bubbler. As the reaction proceeds and iodine reactant is consumed, the deep purple color of the liquid in the reaction vessel will change to pink. As noted heretofore, when the color is a very light pink, the reaction can be considered substantially complete. If desired, more tetrafluoroethylene reactant can then be added to completely decolorize the solution. At this point, conversions and yield are theoretical. Although the preferred order of addition of reactants has been described, this order could be reversed. If further quantities of product are desired, more iodine and tetrafluoroethylene may be added. If solvents other than tetrafluoro-1,2-diiodoethane are employed, the sought-for product can be recovered by fractional distillation. When tetrafluoro-1,2-diiodoethane is employed as solvent, there is, of course, no need for a procedure for separating solvent from product. In the latter event, the liquid in the flask after reaction is both solvent and product and need only be drawn off, as is, as it is formed in excess of any given quantity.

The final product may contain a trace of iodine if the reaction was stopped when a pink color was obtained; or it may contain some tetrafluoroethylene reactant if the reaction was continued to remove iodine traces. Unreacted iodine may be removed by filtration and by washing the product with a dilute aqueous solution of sodium thiosulfate, followed by removing the dissolved water with a suitable drying agent.

Tetrafluoro-1,2-diiodoethane is an unstable material which tends to dissociate upon standing, particularly when exposed to light, thereby releasing free iodine. The presence of excess tetrafluoroethylene may sometimes be desirable because it tends to reverse the dissociation process. This is particularly true since the presence of small amounts of tetrafluoroethylene with tetrafluoro-1,2-diiodoethane will not adversely affect many reactions in which tetrafluoro-1,2-diiodoethane is used as an intermediate. Accordingly, in many cases it will not be necessary to purify the product from unreacted tetrafluoroethylene. Purification from excess tetrafluoroethane, if desired, however, can readily be accomplished by heating the product or by subjecting it to a vacuum.

While the above description refers to batch operations, the procedure of the invention may also be readily adapted to a continuous process. For example, solvent may be passed through a bed of iodine wherein it becomes saturated with the same, following which the saturated solution is passed through a suitable reactor, such as a glass coil, wherein gaseous tetrafluoroethylene is introduced and the mixture is irradiated. The reaction rate would determine the gas flow rate into the solution. Product would be removed from one end of the reactor and, in the preferred embodiment, a portion would go to a receiving vessel with the remainder being recirculated through the iodine bed for use as solvent.

The following examples illustrate practice of the invention.

EXAMPLE 1

About 1 liter of 1,2-dibromotetrafluoroethane together with 10 g. of iodine are charged to a three-necked round bottom flask, equipped with a motor driven stirrer, water cooled reflux condenser, thermometer and gas inlet pipe. The gas inlet pipe is provided with a fritted glass dispersion tip so as to emit gas circulated therethrough and into the liquid in the reaction flask in the form of a large number of small bubbles. A gas outlet tube is fitted to the top of the condenser and is connected to an exit (water) bubbler. Color of the liquid in the flask is dark purple. Tetrafluoroethylene is introduced into the reaction flask through the gas inlet tube, accompanied by vigorous stirring. Initial temperature of the reaction flask contents is that of room temperature (about 22° C.). The only light present is that of available room light. The rate of addition of the tetrafluoroethylene gas is regulated for maximum absorption, or in other words, at a rate just less than would result in bubbling in the exit bubbler. After 25 minutes, the dark purple color of the liquid in the reaction flask changes to a light pink. The pink solution in the reaction flask is fractionally distilled to separate 1,2-dibromotetrafluoroethane solvent and a colorless liquid, which is identified by boiling point and NMR analysis to be the sought-for tetrafluoro-1,2-diiodoethane product.

EXAMPLE 2

The apparatus and procedure are the same as Example 1 excepting that instead of fractionally distilling the pink liquid, an additional 16 g. of iodine are added. The color of the solution returns to deep purple. The liquid is then heated and maintained at reflux temperature (47° C.). A 150 watt spotlight, at a distance of about 6″, is used to irradiate the surface of the liquid. Under these conditions, it takes 1¼ hours to effect change of the deep purple color to light pink, which color change indicates the formation of the sought-for tetrafluoro-1,2-diiodoethane product. While still hot, 25 additional g. of iodine are added to the solution, changing the color again to deep purple, and the light irradiation is continued. After about 1 hours, the purple color of the solution is discharged. An additional 68 g. of iodine are added, again changing the color of the solution back to purple, but this time temperature of the solution is maintained at 20° C., by means of an external water bath. This time the purple color changes to pink in a period of about 1 hour. Another 102 g. of iodine are added, changing the color once again to purple, and the temperature is still maintained at 20° C. The color changes to light pink in a period of about 1½ hours. An additional 90 g. of iodine react, under these conditions, in about 1⅓ hours. Altogether a total of 321 g. (1.26 moles) of iodine are added and about an equivalent amount of tetrafluoroethylene is reacted. The reaction vessel contents are fractionally distilled to remove the 1,2-dibromotetrafluoroethane solvent. A 23 g. intermediate fraction is recovered which consists essentially of a mixture of 1,2-dibromotetrafluoroethane solvent and tetrafluoro-1,2-diiodoethane product. A main fraction (352 g.) of a material boiling at 113° C. is recovered and is identified as tetrafluoro-1,2,diiodoethane. The pot residue of 89 g. is principally tetrafluoro-1,2-diiodothane with some crystals of iodine resulting from decomposition during the distillation. Identifications were made by boiling point comparisons and by NMR analysis.

EXAMPLE 3

The apparatus and procedure are the same as described in Example 1 excepting that 100 g. of iodine are charged to the reaction flask and, during addition of the tetrafluoroethylene reactant, the reaction flask contents are irradiated with a 275 watt sunlamp (rich in UV light). The deep purple color of the solution is discharged in 1½ hours. Identification of the tetrafluoro-1,2-diiodoethane product is made by boiling point and NMR analysis.

EXAMPLE 4

The apparatus and procedure are essentially the same as described in Example 1, excepting that 50 g. of iodine and 475 ml. of carbon tetrachloride are charged to a 1 liter flask and, during addition of the tetrafluoroethylene reactant, the reaction flask contents are irradiated with a 150 watt spotlight. The purple color is discharged in about one hour. The flask contents are then transferred to a 2 liter flask and an additional 475 ml. of carbon tetrachloride and an additional 150 g. of iodine are added. The purple color is discharged in about 2 hours. At the end of this period the product mixture is fractionally distilled to remove carbon tetrachloride solvent and there is obtained 30 g. of an intermediate fraction consisting of carbon tetrachloride solvent and tetrafluoro-1,2-diiodoethane product, and a main fraction consisting of 307 g. of tetrafluoro-1,2-diiodoethane product. Identification was made by boiling point and NMR analysis.

EXAMPLE 5

The apparatus and procedure are essentially the same as described in Example 1, excepting that 50 g. of iodine and 470 ml. of tetrafluoro-1,2-diiodoethane solvent are charged to a 1 liter flask and, during addition of the tetrafluoroethylene reactant, the reaction flask contents are irradiated with a 150 watt spotlight. Temperature of the reaction flask contents is maintained at about 20° C. by means of an external water bath. The 50 g. of iodine react in about 1½ hours following which an additional 50 g. of iodine are added and are reacted in about the same period of time. The reaction flask contents increase in weight by 140 g. and the liquid in the reaction flask is essentially pure tetrafluoro-1,2-diiodoethane, as identified by infrared analysis. Based upon the iodine and tetrafluoroethylene reactants, the yields and conversions are quantitative.

EXAMPLE 6

The apparatus and procedure are essentially the same as described in Example 1, excepting that 108 g. of iodine and 1,063 ml. of tetrafluoro-1,2-diiodoethane are charged to the 2 liter flask and, during addition of the tetrafluoroethylene reactant, the reaction flask contents are irradiated with a 250 watt infrared heat lamp. During the reaction the temperature of the reaction contents is maintained at about 20° C. by means of an external water bath. The dark purple color of the flask contents changes to light pink in a period of about 2 hours and 40 minutes. The reaction is continued until the pink liquid in the reaction flask becomes essentially colorless. Infrared spectrographic analysis shows that the colorless liquid is essentially 100% pure tetrafluoro-1,2-diiodoethane. Yields and conversions based upon the iodine and tetrafluoroethylene reactants are theoretical.

The above description is for illustrative purposes only and it will be evident that deviations and modifications may be made therefrom without departing from the scope and spirit of the invention.

We claim:
1. A process for preparing tetrafluoro-1,2-diiodoethane from tetrafluoroethylene and iodine in which the reaction is initiated at approximately atmospheric pressure by providing a source of actinic radiation, a reaction medium comprising a halogenated hydrocarbon solvent and a reactive temperature level.
2. The process according to claim 1 in which the halogenated hydrocarbon solvent is tetrafluoro-1,2-diiodoethane.
3. The process according to claim 1 in which the actinic radiation employed is visible light possessing wave lengths from about 4,000–7,000 Angstrom units.
4. The process according to claim 1 in which the reaction is initiated at temperatures between about −16 and +50° C.
5. The process according to claim 4 in which the reaction is carried out at temperatures between about 0–20° C.
6. The process for preparing tetrafluoro-1,2-diiodoethane which comprises contacting tetrafluoroethylene and iodine in the presence of a halogenated hydrocarbon solvent, under the influence of actinic radiation, at approximately atmospheric pressure and at a reactive temperature level.
7. The process according to claim 6 in which the halogenated hydrocarbon solvent is tetrafluoro-1,2-diiodoethane.
8. The process for preparing tetrafluoro-1,2-diiodoethane which comprises reacting tetrafluoroethylene with iodine in the presence of a solvent consisting of tetrafluoro-1,2-diiodoethane, at substantially atmospheric pressure, at temperatures substantially in the range of −16 and +50° C., and under the influence of visible light possessing wave lengths in the range of about 4,000–7,000 Angstrom units.
9. The process according to claim 8 in which temperatures are maintained substantially in the range of 0–20° C.

References Cited

FOREIGN PATENTS 698,127    10/1953    Great Britain.

HOWARD S. WILLIAMS, *Primary Examiner.*